June 23, 1953  M. H. ERNST  2,642,669
SCREW-ACTUATED MICROMETER GAUGE
Filed Oct. 3, 1950  2 Sheets-Sheet 1
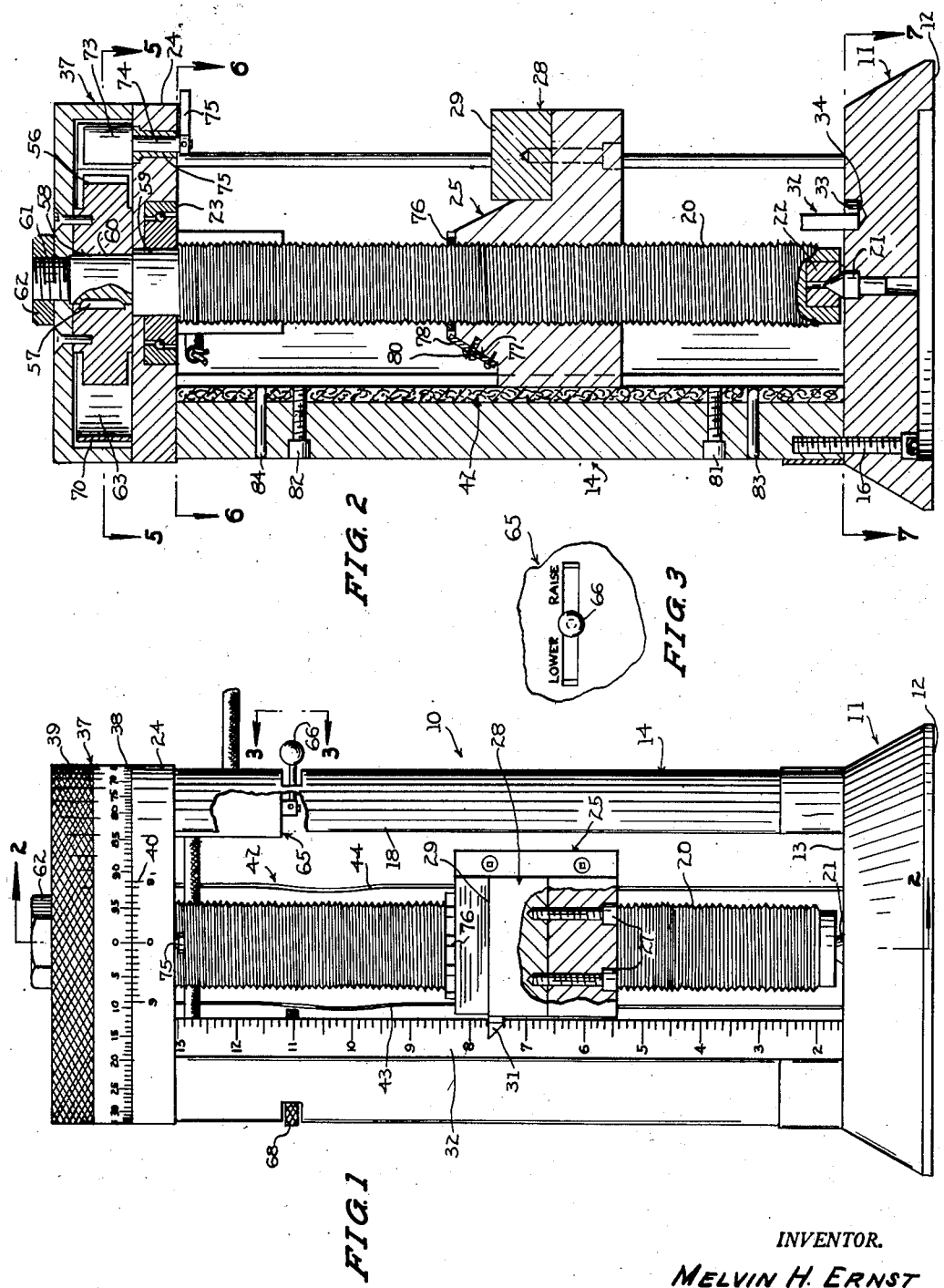
INVENTOR.
MELVIN H. ERNST
BY
McMorrow, Berman & Davidson
ATTORNEYS June 23, 1953  M. H. ERNST  2,642,669
SCREW-ACTUATED MICROMETER GAUGE
Filed Oct. 3, 1950  2 Sheets-Sheet 2

INVENTOR.
MELVIN H. ERNST
BY
McMorrow, Berman & Davidson
ATTORNEYS

Patented June 23, 1953

2,642,669

UNITED STATES PATENT OFFICE 2,642,669

SCREW-ACTUATED MICROMETER GAUGE

Melvin H. Ernst, Birmingham, Mich.

Application October 3, 1950, Serial No. 188,207

3 Claims. (Cl. 33—170)

1

This invention relates to an apparatus for making exceedingly fine measurements, and more particularly to a screw-actuated micrometer gauge.

In machining actuating screws for micrometer gauges, it is virtually impossible to make a perfectly calibrated screw of a predetermined pitch, since the screws are normally cut under stress and at varying temperatures. Furthermore, when cutting screws of any length, there is an accumulation of the pitch errors inherent in the machining operation. Therefore, when using micrometers of the type including an actuating screw, extreme difficulties have been encountered in obtaining highly accurate and precise measurements due to these inherent pitch errors.

Accordingly, it is an object of the present invention to provide a screw-actuated micrometer gauge in which compensations are made for the pitch errors inherent in the machined actuating screw.

Another object of this invention is to provide a screw-actuated micrometer gauge having novel means for compensating the inherent pitch errors of the machined actuating screw with speed, facility and a high degree of accuracy.

A still further object of this invention is to provide a screw-actuated micrometer gauge which is particularly adapted for making height measurements, but is further adapted for measuring the length and width of various objects.

A still further object of this invention is to provide a screw-actuated micrometer height gauge in which the tolerances can be readily checked and the necessary compensations made before the desired accuracy of the gauge is lost.

A still further object of this invention is to provide a screw-actuated micrometer height gauge which is relatively simple in structure and cheap to manufacture.

The above and still further objects and advantages of the invention will become apparent upon consideration of the following detailed description of the invention, when taken in conjunction with the accompanying drawings, wherein:

Figure 1 is a front elevational view, with parts broken away and shown in section, of the micrometer height gauge of the present invention;

Figure 2 is a sectional view taken along the line 2—2 of Figure 1;

Figure 3 is an enlarged fragmentary elevational view taken along the line 3—3 of Figure 1;

2

Figure 4:
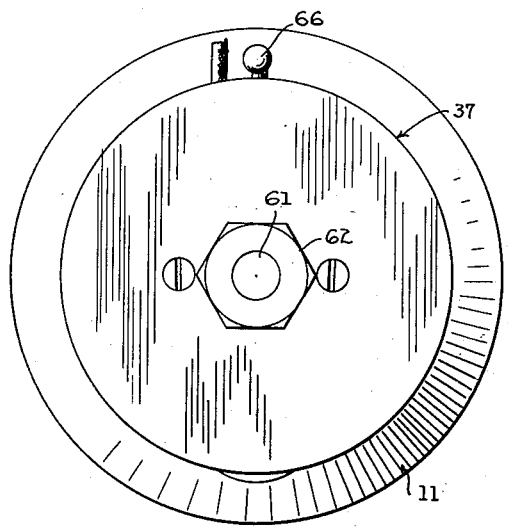
Figure 4 is a top plan view of the micrometer height gauge shown in Figure 1.
Figure 5:
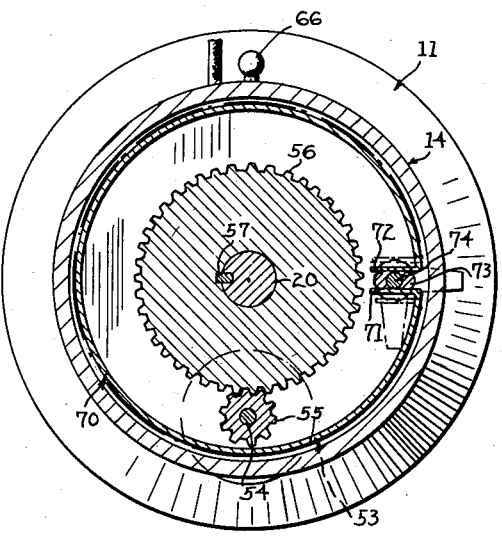
Figure 6:
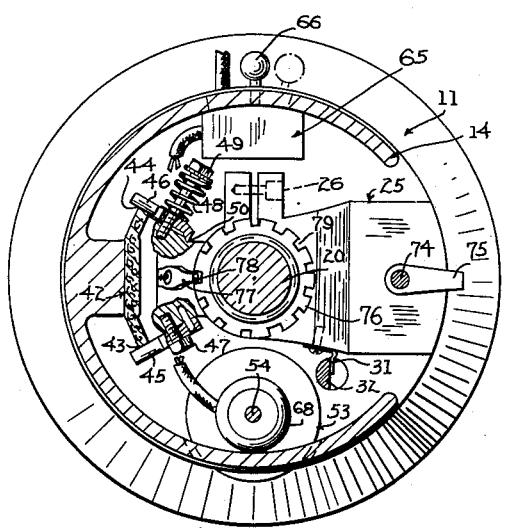
Figure 7:
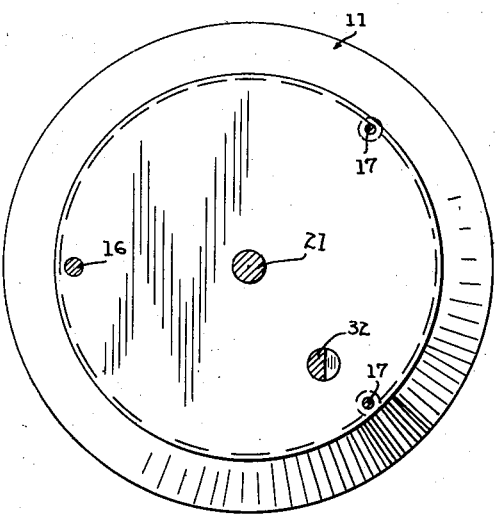

Figure 5 is a sectional view taken along the line 5—5 of Figure 2;

Figure 6 is a sectional view taken along the line 6—6 of Figure 2;

Figure 7 is a sectional view taken along the line 7—7 of Figure 2; and

Figure 8:
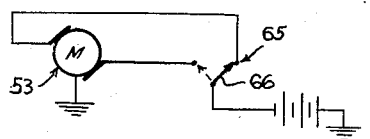

Figure 8 is a schematic diagram of the wiring circuit of the micrometer height gauge of the present invention.

Referring now more particularly to the drawings, wherein like reference numerals have been used throughout the several views to designate like parts, there is shown the micrometer height gauge of the present invention, generally designated by the reference numeral 10, which includes a base 11 having its under surface 12 adapted to be supported on a calibrated plane and horizontal supporting surface.

Resting upon the upper surface 13 of the base 11 is an upstanding, hollow case 14 which is detachably secured to the base 11 by means of the bolts 16, 17. The case 14 is provided with a longitudinally extending, rectangular front opening 18 permitting access to the interior of the case.

Positioned longitudinally within the case is the machined actuating screw 20 which is mounted therein for rotary movement about a vertical axis. As clearly shown in Figure 2, the lower end of the actuating screw 20 is mounted on the base 11 by means of a tool steel male center 21 received within a female center 22 carried by the screw 20. The upper end of the actuating screw 20 is journaled within a frictionless bearing 23 carried by the top plate 24 of the case 14.

Supported in engagement with the actuating screw 20 is a rider nut 25 which is mounted on the screw for movement therealong in response to the rotary movement of the latter. The rider nut 25 is longitudinally split and lapped to the adjusting screw 20 and closely fitted to the latter by the screw 26, Figure 6, which bridges the split. Resting upon and detachably secured to the rod or nut 25 by means of a screw 27 is an anvil 28 which includes a calibrated plane and horizontal reference surface 29 which is adapted to cooperate with the base supporting calibrated plane and horizontal surface in making measurements. Carried by the rider nut 25 is a spring steel pointer 31 which cooperates with a calibrated scale 32 for indicating the position of the reference surface 29 with respect to the base supporting surface. The scale 32 is vertically disposed and supported within the case 14 by any suitable means, such as the filler 33 received within the shallow bore 34 provided in the base 11. The scale 32 is calibrated to read inches and hundredths of an inch, to thereby permit a relatively rough measurement to be taken.

Disposed exteriorly of the top plate 24 of the case 14 is a calibrated micrometer disc 37 which is disposed concentrically of and operatively connected to the actuating screw 20. The micrometer disc or dial 37 is provided with one hundred circumferentially spaced indicia, generally designated by the reference numeral 38, and is knurled, as indicated by the reference numeral 39, to permit the disc to be easily grasped. The indicia 38 cooperate with a vernier 40 provided on the circular top plate 24 for indicating the position of the reference surface 29 with respect to the nearest indicia of the scale 32.

Suitable means are carried within the casing and are operatively connected to the rider nut 25 for effecting a side-to-side movement of the latter in response to the rotary movement of the actuating shaft 20 and proportionate to the pitch errors inherent in the machined actuated screw. As clearly shown in Figures 1 and 2, the means embodies a vertically disposed slide 42 supported within the casing contiguous to and rearwardly of the screw 20, the slide having its opposed side edges 43 and 44 arcuately cut away to compensate for the inherent pitch errors of the actuating screw 20. Carried by the rider nut 25 and engaging the slide 42 are the contact fingers 45 and 46, Figure 6, which effectively couple the rod and nut to the slide. The finger 45 is detachably secured to the adjacent portions of the rider nut 25 by means of the bolt 47 and engages the adjacent arcuately cut-away side edge 43 of the slide 42. The finger 46 is spring biased into engagement with the arcuately cut side edge 44 of the slide 42 by means of the spring 48 and the bolt 49 which extends through the spring and is engaged within the adjacent portions of the rider nut 25. The finger 46 is provided with a knife edge 50 engaged within a complementary cut provided in the nut 25, to thereby mount the finger 46 to ride along the slide 42. The spring-biased finger 46 forces the rider nut 25 to closely follow the compensated slide to thereby accurately compensate for the inherent pitch errors in the actuating screw 20. As previously pointed out, the pointer 31 is fabricated of a spring steel and permits the nut 25 to swing from side to side without interference between the spring steel pointer 31 and the scale 32.

Operatively connected to the machined actuating screw is a reversible motor 53 which is supported within the case 14 contiguous to the top plate 24. The motor 53 includes a vertically extending drive shaft 54 carrying a drive pinion 55 which is in meshing engagement with a driven gear 56. The driven gear 56 is disposed transversely of and circumposed about the actuating screw 20 and secured to the latter by means of a key 57. As clearly shown in Figure 2, the actuating screw 20 includes an extension 58 secured thereto, the extension including a first end adjacent section 59 received within the bearing 23, and intermediate section 60 extending through and secured to the gear 56, and another end adjacent section 61 which is threaded and fixedly secured to the micrometer disc 37 by means of the nut 62. The interior of the micrometer disc 37 is chambered, as indicated by the reference numeral 63, for the accommodation therein of the gear 56. The reversible motor 53 is electrically connected to a source of electrical energy, not shown, and to a three-position switch 65 including a switch arm 66. As clearly shown in Figure 3, the switch 65 has a central neutral position, and positions for effecting the rotary movement of the machined actuating screw 20 in either direction. One of the last-named positions is designated as the lower position and corresponds to the direction of rotation of the actuating screw 20 which will lower the rider nut 25. The other position is designated as the raised position, and corresponds to the direction of rotation of the actuating screw which will raise the rider nut 25. Accordingly, the reversible motor 53 can be intermittently and selectively actuated for effecting the rotary movement of the actuating screw 20.

On the end of the motor shaft 54 opposite from the pinion 55 is a handwheel 68 for making final adjustments when making a measurement. The handwheel 68, as clearly shown in Figure 1, is operable exteriorly of the case 14 and permits a fine adjustment for the actuating screw 20 in a select position of its rotary movement, to thereby adjust the reference surface 29 with respect to a reference point.

Carried by the case 14 and engageable with the disc 37 is a lock band 70 for locking the disc 37 against movement with respect to the case 14 to prevent losing a desired setting by any slight shock or bump of the gauge 10. The lock band 70 is disposed interiorly of the chambered disc 37 and engages the bounding walls of the chamber 63 upon the application of a spreading force to the lock band. As clearly shown in Figure 5, the lock band 70 is split and has its free ends 71 and 72 bent into spaced confronting relation with respect to each other. Supported intermediate the confronting bent ends 71 and 72 of the lock band 70 is a camming element 73 for selectively urging the outer periphery of the lock band 70 into engagement with the bounding wall of the chamber 63. The camming element 73 is mounted on an upstanding shaft 74 rotatably journaled in a bearing sleeve 75 carried within the top plate 24 of the case 14. Disposed transversely of the free end of the shaft 74 is a handle 75 for actuating the cam 73. As clearly shown in Figure 2, the handle 75 is disposed exteriorly of the case 14 contiguous to and beneath the top plate 24 thereof in a readily accessible position.

Circumposed about the actuating shaft 20 and engaging the adjacent surface of the rider nut 25 is a tension nut 76 which is set to take up any end play inherent in the device. The tension nut 76 is held in place by a tension nut lock 77, the latter including a tongue 78 engaged within one of a plurality of circumferentially spaced, radially extending notches 79 provided in the periphery of the tension nut 76. The tension nut lock 77 is secured to the rider nut 25 by any suitable means, such as the screw 80.

As clearly shown in Figure 2, the slide 42 is detachably secured to the case 14 by means of the spaced screws 81 and 82 and the spaced dowels 83 and 84. Accordingly, the compensating slide 42 can be removed from its supported position within the case 14 with speed and facility and recalibrated or replaced.

In actual construction, the actuating screw 20 is appropriately compensated by means of the slide 42. In this manner, very fine measurements can be taken and if it is intended to make the gauge even more accurate, other factors may be controlled, such as the supporting surface for the gauge, the temperature at which the measurements are made, and a predetermined limit of the weight on the working anvil 28. If desired, a thermometer can be mounted on the case and graduated at 68° F., this being the temperature at which the height gauge 10 is normally compensated.

Actual measurements are taken in a manner similar to that employed when using a conventional micrometer, and it is readily apparent from the foregoing that the gauge can be easily checked and corrected to alter the tolerances before the desired accuracy is lost.

Although only one embodiment of the micrometer gauge of the present invention has been described, it is readily apparent that numerous modifications can be made without departing from the spirit of the invention as set forth in the appended claims.

What I claim is:

1. In a micrometer gauge, a hollow vertical case having a base on its lower end adapted to rest upon a calibrated plane and horizontal surface, a top plate closing the upper end of the case, an actuating screw rotatable in the case mounted at its lower end on said base and having an upper end portion freely journalled through said top plate, a rider nut threaded on the actuating screw for vertical movement on the actuating screw between said base and said top plate, as the screw is rotated, said rider nut having an anvil having a calibrated plane and horizontal surface, a vertical slide fixed in said case at a point remote from the anvil, said slide having vertical side edges deformed to compensate for pitch errors inherent in the actuating screw, and fingers projecting from said rider nut at a point remote from the anvil, said fingers being engaged with the vertical side edges of the slide whereby said rider nut is moved sidewise to compensate for pitch errors in the actuating screw as said actuating screw is rotated, and means for actuating said actuating screw in opposite directions.

2. In a micrometer gauge, a hollow vertical case having a base on its lower end adapted to rest upon a calibrated plane and horizontal surface, a top plate closing the upper end of the case, an actuating screw rotatable in the case mounted at its lower end on said base and having an upper end portion freely journalled through said top plate, a rider nut threaded on the actuating screw for vertical movement on the actuating screw between said base and said top plate, as the screw is rotated, said rider nut having an anvil having a calibrated plane and horizontal surface, a vertical slide fixed in said case at a point remote from the anvil, said slide having vertical side edges deformed to compensate for pitch errors inherent in the actuating screw, and fingers projecting from said rider nut at a point remote from the anvil, said fingers being engaged with the vertical side edges of the slide whereby said rider nut is moved sidewise to compensate for pitch errors in the actuating screw as said actuating screw is rotated, and means for actuating said actuating screw in opposite directions, one of said fingers being stationary and the other finger being movably mounted on the rider nut, and spring means biasing said other finger toward engagement with the related vertical side edge of the slide.

3. In a micrometer gauge, a hollow vertical case provided with a base on its lower end, a top plate fixed on the upper end of the case, an actuating screw in the case having a lower end rotatably engaged with the base and an upper portion journalled through said top plate, a calibrated micrometer disc fixed on said upper end portion of the screw above said top plate, having a depending skirts and locking means comprising a split spring ring located between said top plate and said disc and normally disengaged from the skirt of the micrometer disc, and cam means mounted on said top plate and operatively engaged with said split ring for holding said ring stationary with respect to the top plate and for expanding said ring into frictional engagement with said skirt for locking the disc and the actuating screw in an adjusted position.

MELVIN H. ERNST.

References Cited in the file of this patent

UNITED STATES PATENTS

| Number | Name | Date |
|---|---|---|
| 1,307,816 | Garbin | June 24, 1919 |
| 1,508,875 | Davis | Sept. 16, 1924 |
| 1,568,295 | Schleicher | Jan. 5, 1926 |
| 1,879,294 | Jones et al. | Sept. 27, 1932 |
| 2,037,858 | Holls | Apr. 21, 1936 |
| 2,173,519 | Jones | Sept. 19, 1939 |
| 2,252,146 | Walsh | Aug. 12, 1941 |
| 2,294,831 | Carson | Sept. 1, 1942 |
| 2,344,878 | Jarosz | Mar. 21, 1944 |
| 2,394,137 | Barlow | Feb. 5, 1946 |
| 2,448,473 | Shrewbury | Aug. 21, 1948 |
| 2,536,625 | Button | June 2, 1951 |

FOREIGN PATENTS

| Number | Country | Date |
|---|---|---|
| 408,394 | Great Britain | Apr. 12, 1934 |